US010018237B2

(12) United States Patent
McCarthy (10) Patent No.: US 10,018,237 B2
(45) Date of Patent: Jul. 10, 2018

(54) TOWED ROPING DUMMY SHOCK ABSORPTION APPARATUS

(71) Applicant: John Nolan McCarthy, Von Ormy, TX (US)

(72) Inventor: John Nolan McCarthy, Von Ormy, TX (US)

( * ) Notice: Subject to any disclaimer, the term of this patent is extended or adjusted under 35 U.S.C. 154(b) by 0 days.

(21) Appl. No.: 15/418,850

(22) Filed: Jan. 30, 2017

(65) Prior Publication Data
US 2017/0138430 A1 May 18, 2017

Related U.S. Application Data

(63) Continuation of application No. 13/561,143, filed on Jul. 30, 2012, now Pat. No. 9,554,559.

(51) Int. Cl.
| | |
|---|---|
| *F16F 3/04* | (2006.01) |
| *F16F 1/04* | (2006.01) |
| *F16F 3/06* | (2006.01) |
| *A01K 15/00* | (2006.01) |
| *A01K 15/02* | (2006.01) |
| *A63B 69/00* | (2006.01) |

(52) U.S. Cl.
CPC .............. *F16F 3/06* (2013.01); *A01K 15/003* (2013.01); *A01K 15/02* (2013.01); *A63B 69/0068* (2013.01); *F16F 3/04* (2013.01)

(58) Field of Classification Search
CPC ........ B60D 1/043; B60D 22/30; B60D 22/36; B60D 1/04; B60D 3/04; B60T 1/043; B60T 22/30; B60T 22/36; B60T 1/04; B60T 3/04; F16F 1/043; F16F 22/30; F16F 22/36; F16F 1/04; F16F 3/04

USPC .......... 267/138; 280/455.1, 456.1, 462, 467, 280/482
See application file for complete search history.

(56) References Cited

U.S. PATENT DOCUMENTS

| | | | | |
|---|---|---|---|---|
| 1,208,430 | A * | 12/1916 | Wigle ..................... | F16F 1/128 267/71 |
| 2,125,702 | A * | 8/1938 | Watson ................. | B60T 11/107 188/112 R |
| 2,650,101 | A * | 8/1953 | Frankfother ............. | B60D 1/28 280/457 |
| 2,709,604 | A * | 5/1955 | Hartman .................. | B60D 1/34 280/406.1 |
| 2,808,272 | A * | 10/1957 | Reese .................... | B60D 1/065 172/450 |
| 3,116,056 | A * | 12/1963 | Maier ....................... | F16F 3/04 267/135 |
| 3,140,080 | A * | 7/1964 | Rumsey ................... | B61G 9/18 213/22 |
| 3,373,961 | A * | 3/1968 | Long ...................... | D06F 37/20 210/364 |
| 3,787,069 | A * | 1/1974 | Chauncey ................ | B60D 1/28 280/432 |
| 3,787,077 | A * | 1/1974 | Sanders ................... | B60D 1/32 280/432 |

(Continued)

*Primary Examiner* — Thomas J Williams
*Assistant Examiner* — James K Hsiao
(74) *Attorney, Agent, or Firm* — Jackson Walker LLP (57) ABSTRACT

The towed roping dummy shock absorption apparatus provides for an apparatus designed to be inserted between a pulling vehicle and a towed roping dummy when practicing team roping from horseback. The apparatus provides for modulation of jerks and forces on the dummy that cause strain on the vehicle, dummy and horse, as well as providing for more consistent speed when being towed.

8 Claims, 6 Drawing Sheets

(56) References Cited

U.S. PATENT DOCUMENTS

| | | | | | |
|---|---|---|---|---|---|
| 3,934,838 | A | * | 1/1976 | D'Amico | A22C 25/025 242/405.1 |
| 4,281,847 | A | * | 8/1981 | Robe | B60D 1/243 280/455.1 |
| 4,545,322 | A | * | 10/1985 | Yang | F16F 7/08 16/85 |
| 4,718,690 | A | * | 1/1988 | Baker | B60D 1/182 280/480 |
| 5,348,331 | A | * | 9/1994 | Hawkins | B60D 1/322 280/455.1 |
| 5,915,715 | A | * | 6/1999 | Ford | B60D 1/155 280/460.1 |
| 5,957,477 | A | * | 9/1999 | Ensz | B60D 1/155 280/482 |
| 6,286,853 | B1 | * | 9/2001 | Lauzon | B60D 1/155 267/138 |
| 6,474,675 | B1 | * | 11/2002 | Bockman | B60D 1/182 267/138 |
| 6,485,046 | B1 | * | 11/2002 | Hsueh | B60D 1/065 280/455.1 |
| 6,581,953 | B2 | * | 6/2003 | Jerry | B60D 1/50 267/138 |
| 6,834,879 | B1 | * | 12/2004 | Lorman | B60D 1/06 280/483 |
| 7,552,830 | B2 | * | 6/2009 | Radewagen | B61G 7/10 213/20 |
| 8,540,257 | B1 | * | 9/2013 | Merchant | B62D 7/22 267/150 |
| 2004/0232652 | A1 | * | 11/2004 | Namuduri | B60D 1/322 280/455.1 |
| 2006/0249926 | A1 | * | 11/2006 | Smith | B60D 1/167 280/491.1 |
| 2009/0201689 | A1 | * | 8/2009 | Nolle | B60P 3/18 362/485 |

\* cited by examiner

TOWED ROPING DUMMY SHOCK ABSORPTION APPARATUS

This application is a continuation application that is based upon and claims priority from U.S. utility application Ser. No. 13/561,143, which is incorporated herein by reference.

BACKGROUND OF THE INVENTION

Field of the Invention

Applicant's invention relates to a device for a towed roping dummy shock absorption apparatus. More particularly, it relates to a device that reacts to applied pressure and forces on a roping dummy as it is towed and roped.

Background Information

Roping cattle from horseback is a historical process that many recognize. Branding and doctoring the cattle necessitated that cowboys capture the animals, and early ranches where this process completed without the benefit or aid or pens and specialized shoots necessitated a very specific skill of the cowboys, as well as necessitating specialized equipment. Part of this specialized equipment included development of the western saddle. These skills and equipment in practice in many places yet today.

Many people are also familiar with the transition that was made of the various roping styles to rodeo events. One of the roping styles that found its way to the rodeo arena, and continues to grow in popularity, is the sport of team roping. Team roping, as its name implies, is an event that is completed by two ropers. The first roper, called the header, ropes the animals first and either ropes the animal around the neck or, more preferably, around the horns. The second roper, called the healer, waits for the header to slow the animal and turn the animal at an approximate 90-degree angle before roping the animal's hind legs.

In a typical rodeo run, the steer is placed in a starting gate called a shoot. Behind the shoot is a three-sided area called the box in which the header and healer start on their horses. Traditionally, the header and healer were in a double-box to the rear and on the right side of the steer. However, in the last few decades, it has become most common that the header starts in a box to the rear and on the left side of the steer, while the healer starts in a box to the rear and on the right side of the steer. The header calls for the steer to be released by nodding his head or otherwise indicating his readiness. The steer is given a designated head start, called a score, and the ropers (or at least the header) are required to wait in the box until the steer reaches a certain point, at which time they can leave the box in pursuit of the steer.

Once the ropers leave the box, their horses chase the steer an attempt to close the distance between the animals. As the header gets closer to the steer, he generally attempts to arrive to the rear of the animal close enough to rope it and slightly to its left. Meanwhile, the healer rates his horse back and to the right of the steer such that he is ready to close the gap after the header ropes, but also he can attempt to help keep the steer from ducking to the right.

Once the roper has gotten close enough to the steer to rope, he ropes the steer around the horns or neck and pulls his slack to tighten the loop around the steer's horns. He then takes a couple of wraps around his saddle horn with the free end of the rope (the "dally") so that the steer is effectively attached by the rope to the saddle of the horse and rider. The header then signals his horse to slow which also slows the steer slightly. Then he turns his head horse off to the left at approximately a 90-degree angle such that the steer is then pulled to the left as well. Once the steer changes directions, the healer is then allowed to take his throw at the heels of the steer. He attempts to rope both hind feet, although roping one hind foot is a legal catch as well, albeit one with a penalty. Once the healer ropes the hind feet, he dallies his rope as well and stops his horse. The header continues until he takes the slack out of his rope, and then turns his horse to face the steer, leaving the steer immobilized between the two horses.

The western saddle was traditionally, and is still, used on working horses on cattle ranches throughout the United States, particularly in the west. They are the "cowboy" saddles familiar to movie viewers and rodeo fans. The western saddle is characterized as allowing great freedom of movement to the horse, and security to the rider and strong control of the horse. One extremely functional item is virtually always identified with the western saddle—the saddle "horn."

As is evident from the description of team roping above, the saddle horn is integral to roping cattle, whether it is in team roping as described above, or in branding, doctoring, tie-down calf roping, or other instances in which an animal is roped and snubbed to the roper's saddle. The saddle horn allows cowboys to control cattle by use of a rope around the neck, horns, or legs of the animal, tied or dallied around the horn. A "dally" is the term for when the rope is wrapped around the horn, without a knot, to cinch the bovine to the saddle. The free end of the rope is wrapped around the horn and held by the cowboy.

As in any sport, practice is a big part of learning and perfecting a roper's abilities. Practicing in a "live" situation—roping steers from horseback in a rodeo arena—is generally considered the best type of practice. However, for a variety of reasons various types of mechanical aids have been developed. One of the most popular is a roping "dummy." Many variations of roping dummies have been developed. One of these types is a towed dummy. Generally, a towed dummy is pulled by a motorized vehicle, such as an ATV, tractor, or the like, although they can also be towed by a horse or other towing vehicle.

Towed roping dummies are designed to more accurately duplicate a live roping run than a stationary dummy, but providing a controlled environment for horse training and roping practice. Because the dummy may be towed at a desired speed, the run may be tailored to the skill or desire of the individual roper or horse. It also allows the roper to practice in a more controlled environment and complete multiple realistic practice runs without using live cattle.

The towed dummy allows the roper to follow the dummy on his or her horse at a given speed, rope the heels of the dummy, then stop the horse. The forward motion of the dummy applies tightening pressure on the dummy and resistance to the horse until the towing vehicle stops, just as in a live run. However, unlike a live run, the power of the towing vehicle and the inelastic nature of the mechanical devices (towing vehicle and dummy) tend to exert a strong pull on the horse as it stops. Further, in order to mimic a live roping run, the towing vehicle will generally drive in an arc or "L" shaped pattern. This turn causes jolts and jerks on the dummy rather than a smooth, more life-like team roping run.

SUMMARY OF THE INVENTION

The present invention is a shock absorbing device design to smooth the towing and roping of a towed roping dummy.

DETAILED DESCRIPTION OF THE PREFERRED EMBODIMENT

| Ref. No. | Object |
| --- | --- |
| 10 | Roping Dummy Shock Absorber |
| 12 | Tube |
| 14 | Moto-Side End Cap |
| 16 | Dummy-Side End Cap |
| 18 | Lubricant Nozzle |
| 20 | Rod |
| 20A | Rod First Spring Set Section |
| 20B | Rod Second Spring Set Section |
| 20C | Rod Third Spring Set Section |
| 22 | Tang |
| 24 | Tang Aperture |
| 26 | Hitch |
| 28 | Hitch Aperture |
| 30 | Turn Stop |
| 32 | Stop Bumper |
| 34 | Stop Bumper Connector |
| 36A | First Spring-Stop |
| 36B | Second Spring-Stop |
| 38 | Rod Endpiece |
| 40 | Rod Aperture |
| 50 | First Spring |
| 52 | Second Spring |
| 54 | Third Spring |
| 56 | Fourth Spring |
| 58 | Fifth Spring |
| 60 | Sixth Spring |
| 100 | Dummy |
| 102 | Sled |
| 104 | Tow Bar |
| 106 | Dummy Hitch |
| 108 | Moto Tang |

Figure 1:
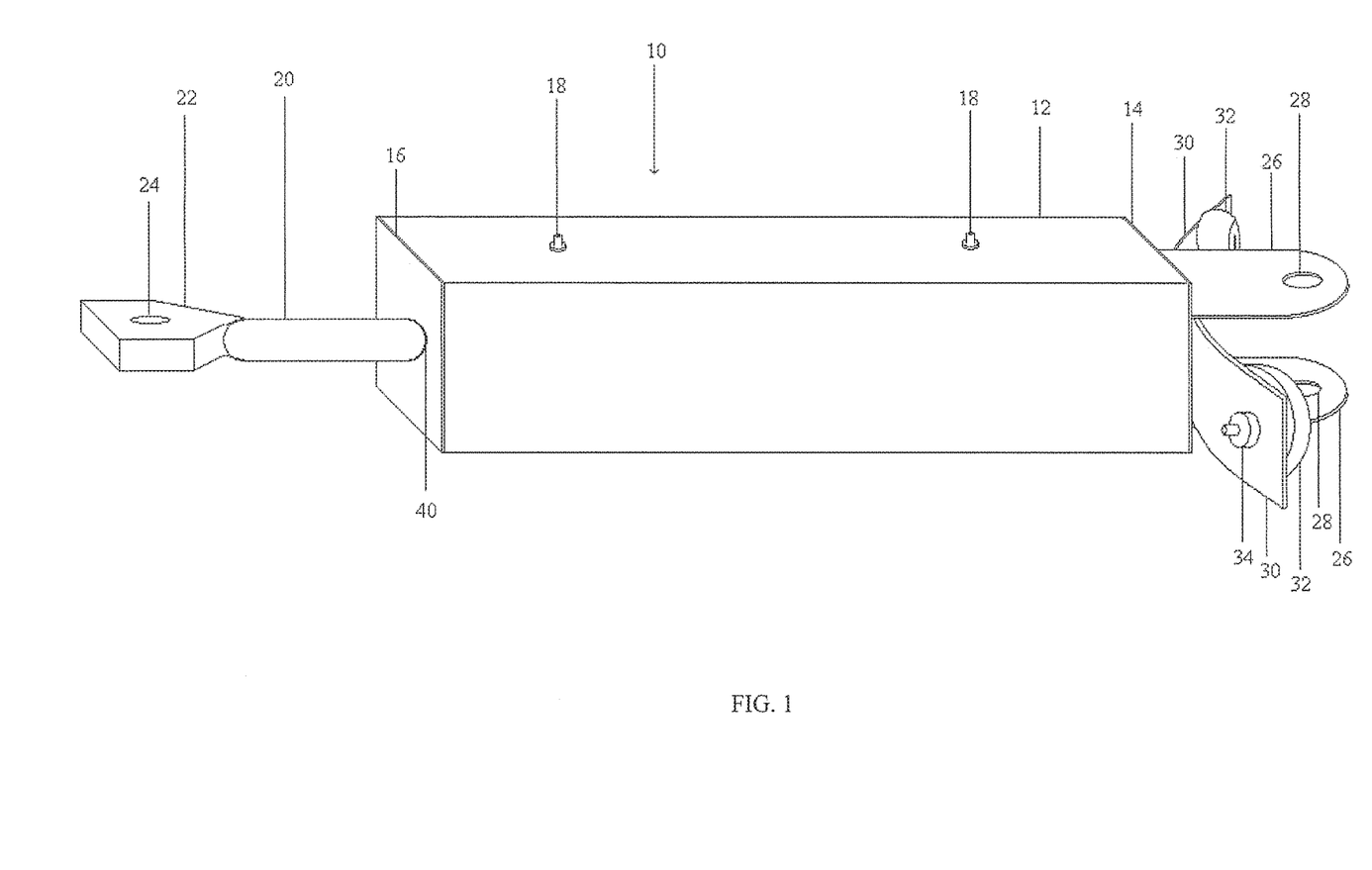
FIG. 1. is a perspective view of the roping dummy shock absorber.

Referring to the figures, FIG. 1. illustrates a perspective view of the roping dummy shock absorber. The roping dummy shock absorber 10 is comprised of a hollow tube 12 that is closed at the first open end—the end that would generally be nearest to the dummy hitch 106 when in use—by an attached first, or dummy-side, end cap 16. The second open end of the hollow tube 12—the end which would generally be nearest to the moto tang 108 when in use—is closed by an attached second, or moto-side, end cap 14. A rod 20 extends from the inside of the tube 12 through a rod aperture 40—which is sized to allow the rod to slide through it—in the dummy-side end cap 16. In a preferred embodiment, the rod 20 is a shaft with a diameter or width of from ¼ inch to 1½ inches. On the first end of the rod 20 outside the tube 12, a first hitch apparatus is attached. The first hitch apparatus is removably attachable to a hitch on a dummy 106—where "removably attachable" is defined to mean that the operative purpose of the device is to attach and detach without damaging the device. The first hitch apparatus may be comprised of a tang 22 or other type of hitch that is removably attachable to the dummy hitch 106. As used herein, if a component is said to be "removably attachable" it means that the component is configured and capable of being attached to, and detached from, a second component a multiplicity of times without destruction of either component (although it is contemplated that the repeated attachment and detachment of the components may cause wear to the components that might eventually affect the components). The tang 22 allows the roping dummy shock absorber 10 to be hitched to the dummy hitch 106. As shown, the vehicle and dummy hitches are clevis type hitches, however it is anticipated that other styles of hitches could be incorporated. In order to allow a clevis pin to attach the tang 22 to the dummy hitch 106, the tang 22 has a tang aperture 24 sized so as to allow a clevis pin (not shown) to slide through the tang aperture 24. In a preferred embodiment the tang 22 is approximately ⅜ inch thick, flat steel and the tang aperture 24 has a diameter of approximately 9/16 inches.

On the vehicle side of the roping dummy shock absorber 10, a second hitch 26 is attached to the moto-side end cap 14. The second hitch 26 is shown as a clevis type hitch and has hitch apertures 28, sized so as to allow a clevis pin (not shown) to slide through the hitch apertures 28. In a preferred embodiment the hitch 26 is approximately ⅜ inch thick, flat steel and the hitch apertures 28 have diameters of approximately 9/16 inches.

Two opposing turn stops 30 are attached to the moto-side end cap 14. The turn stops 30 prevent the dummy 100 from "jack-knifing" or turning into a too extreme angle with the towing vehicle. In effect, the turn stops restrict the horizontal rotation of the shock absorption apparatus in relation to the towing vehicle. The turn stops 30 may have stop bumpers 32 attached to them via stop bumper connectors 34. The stop bumpers 32 pad contact between the moto-tang 108 and the roping dummy shock absorber 10, and are generally rubber or other elastic material.

In order to aid movement inside the tube 12, one or more lubricant nozzles 18 may be provided along the tube 12. The lubricant nozzles 18 are in operative communication with the interior of the tube and provide a path for lubricants to be inserted into the interior of the tube 12 while preventing the lubricants from escaping from the tube 12, or dirt or debris from entering the tube 12.

Figure 2:
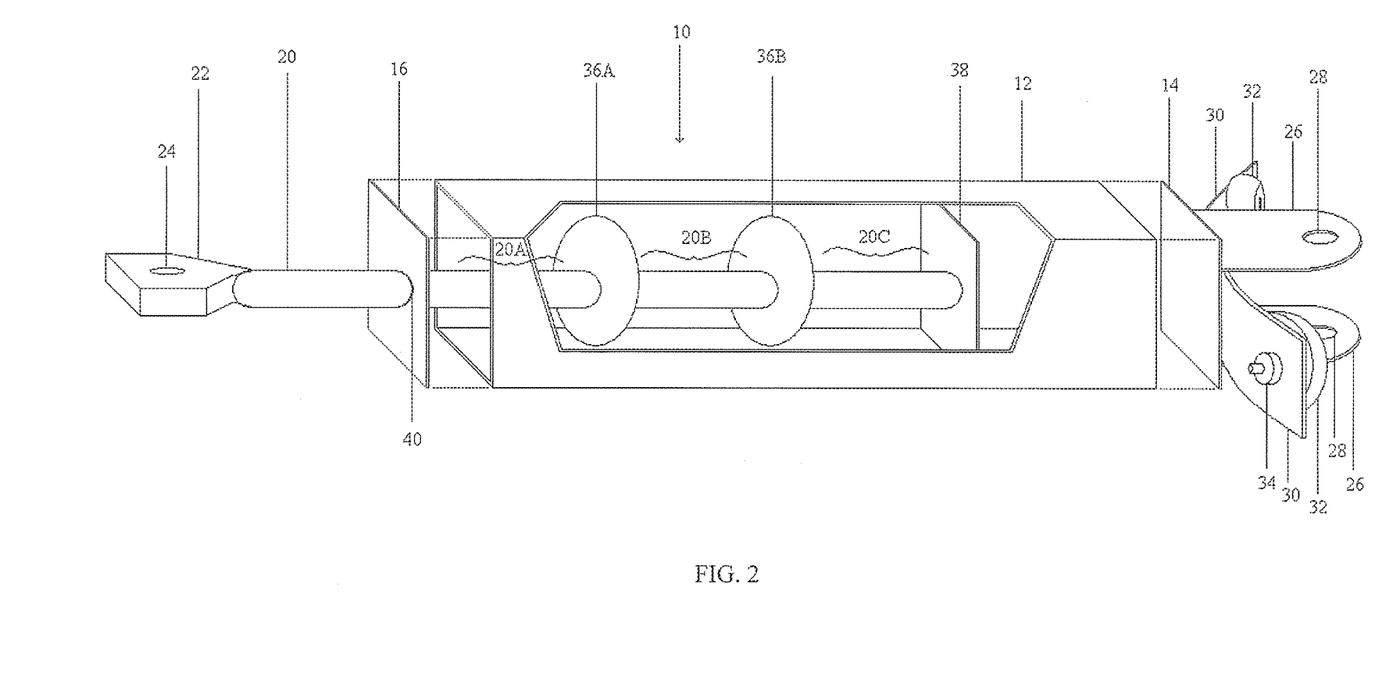
FIG. 2. is a cut-away, exploded, perspective view of the roping dummy shock absorber.

FIG. 2. shows a cut-away, exploded, perspective view of the roping dummy shock absorber. It is preferable that the rod 20 does not rotate during operation. Therefore, in the preferred embodiment the tube 12 is a hollow, non-circular or square tube. Other tube shapes could be used that have angles sufficient for the corners of the rod endpiece 38 to stop rotation of the rod 20. It is also anticipated that "stops" could be inserted into the tube 12 to contact the rod 20, or pieces attached to the rod 20, or the rod 20 and the rod aperture 40 shaped and sized to prevent rotation of the rod 20. However, it is likewise anticipated that the tube 12 could be round and the rod 20 allowed to rotate. The rod 20 is inserted through the rod aperture 40 and into the interior of the tube 12. Rod 20 has an interior portion with a first end inside the interior of the tube 12, and an exterior portion with a second end outside of the tube 12. Inside the tube 12, a rod endpiece 38 is attached to the end of the rod 20. The rod endpiece 38 provides a wall for the springs (50, 52, 54, 56, 58 and 60) to push against. Further, the rod endpiece 38 is sized and shaped to fit into and slide within the tube 12, but also to prevent the rod 20 from rotating. In the preferred embodiment, the tube 12 is constructed from 3 inch.times.3 inch hollow steel tube, and the rod endpiece 38 is constructed from 3/16 inch thick flat steel that is approximately 2¾ inches square.

Along the interior portion of the rod 20, inside the tube 12, a first spring-stop 36A and a second spring-stop 36B are slidably attached around the diameter of the rod 20. The first spring-stop 36A and the dummy-side end cap 16 create a rod first spring set section 20A. The first spring-stop 36A and the second spring-stop 36B create a rod second spring set section 20B. And the second spring-stop 36B and the rod endpiece 38 create a rod third spring set section 20C. The rod spring set sections 20A, 20B and 20C are sections along the length of the interior portion of rod 20. Springs 50 and 52 are placed about rod spring set section 20A. Springs 54 and 56 are placed about rod spring set section 20B. Springs 58 and 60 are placed about rod spring set section 20C. The dummy-side end cap 16, the spring-stops 36A and 36B, and the rod endpiece 38 provide solid supports against which the coiled springs (50, 52, 54, 56, 58 and 60) may compress and push. The spring-stops 36A and 36B are able to slide along the interior portion of rod 20.

Figure 3:
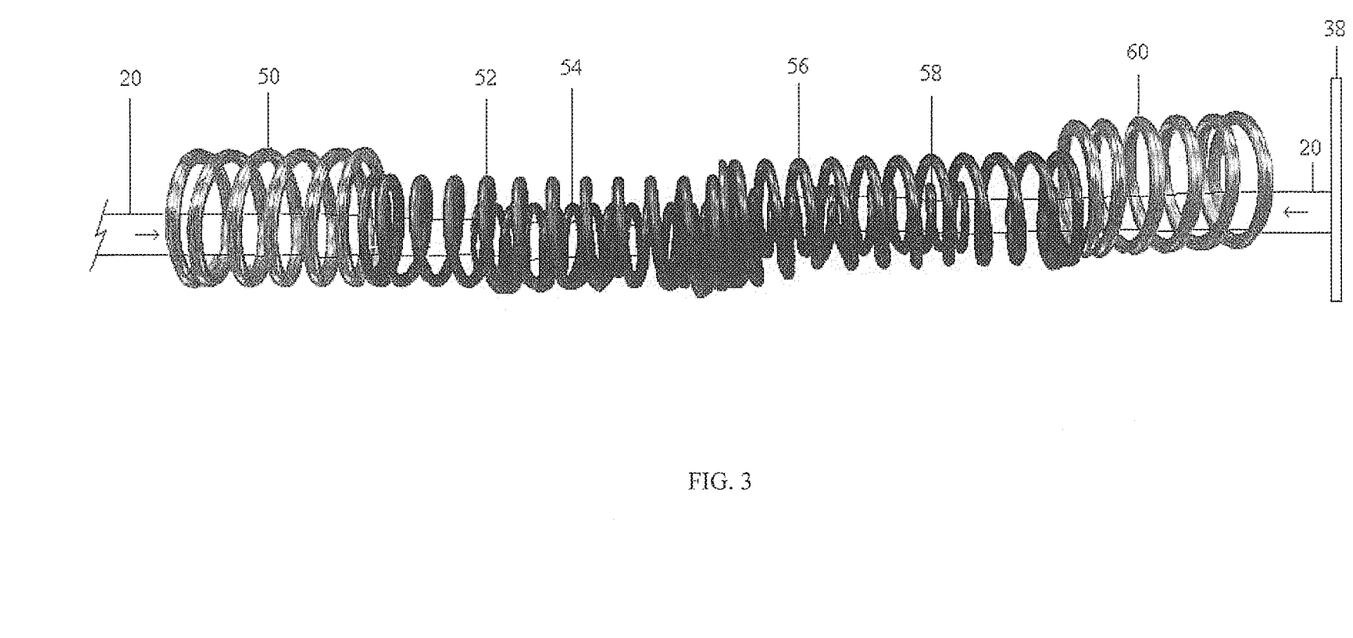
FIG. 3. is a perspective view of the springs of the roping dummy shock absorber.

FIG. 3. illustrates the straight, coiled springs (50, 52, 54, 56, 58 and 60) of the roping dummy shock absorber. The springs (50, 52, 54, 56, 58 and 60) are inserted around the rod 20. The springs (50, 52, 54, 56, 58 and 60) have varying spring rates or spring constants. This allows the roping dummy shock absorber 10 to provide varying force against the pull of the dummy on the towing vehicle based upon how hard the dummy is towed and pulled when roped.

| Ref. No. | Coil Shape | Spring Pitch | Outer Diameter | Inner Diameter | Wire Diameter | Free Length | Solid Height | Spring Rate lbs/in |
|---|---|---|---|---|---|---|---|---|
| 50 | Straight | Constant | 2.34 | 1.84 | 0.25 | 3.0 | 1.5 | 153 |
| 52 | Straight | Constant | 1.94 | 1.44 | .25 | 6 | 3.22 | 108 |
| 54 | Straight | Constant | 1.23 | .901 | .162 | 4 | 2.05 | 78 |
| 56 | Straight | Constant | 1.94 | 1.52 | .207 | 6 | 2.41 | 53 |
| 58 | Straight | Constant | 1.4 | 1.05 | .177 | 5 | 2.32 | 69 |
| 60 | Straight | Constant | 2.34 | 1.84 | 0.25 | 3.0 | 1.5 | 153 |

When a force is placed upon the rod 20 which tends to pull the rod 20 outwardly through the rod aperture 40, the springs act in opposition to the force. The multiple springs provide variable resistance and spring rate as the rod 20 extends or retracts from the tube 12. It is anticipated that alternatives to coiled springs could be used in the roping dummy shock absorber 10, such as elastomers, air or gas, or oil or minimally compressible fluid in order to provide variable resistance, rebound and damping in similar force as the coiled springs.

Figure 4:
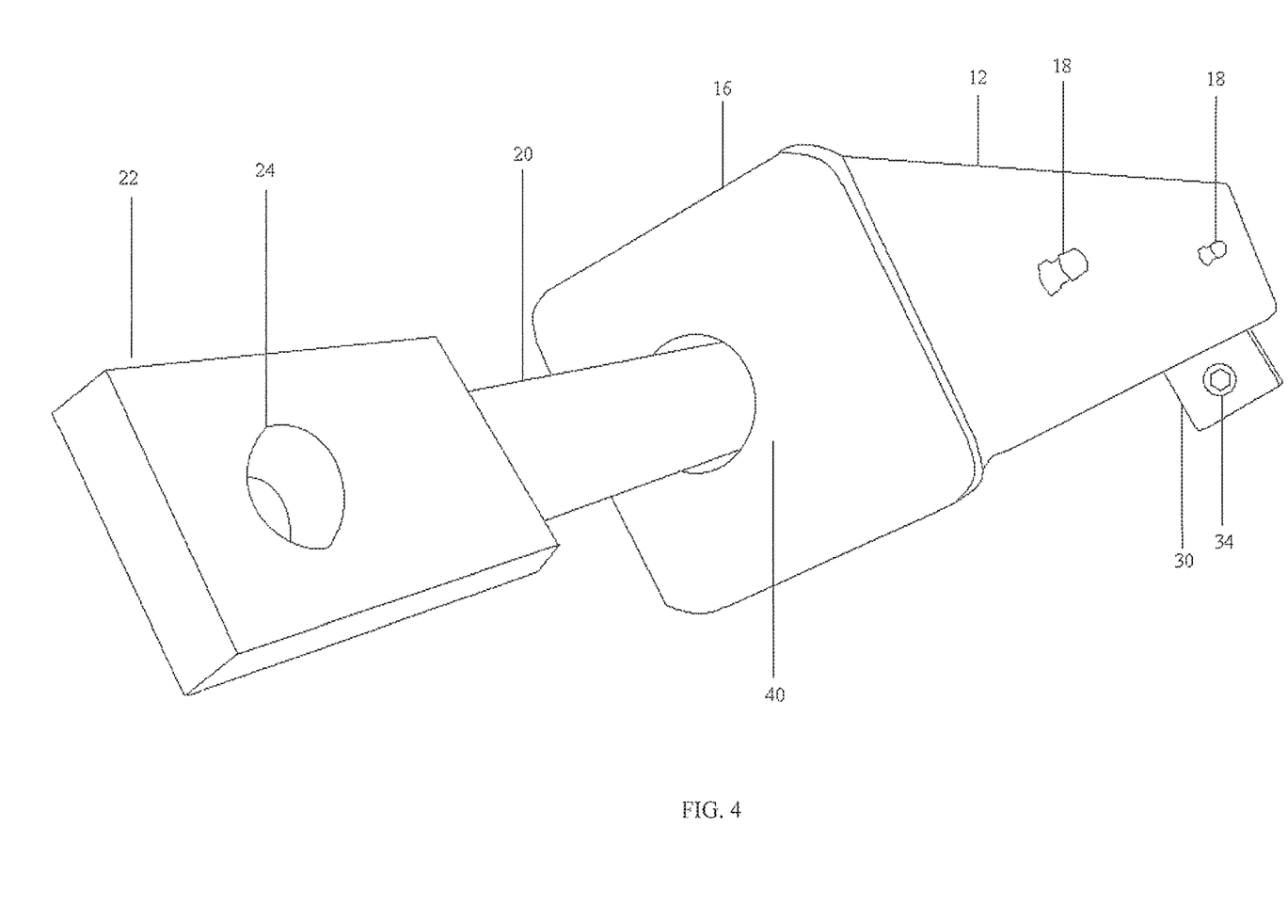
FIG. 4. is a front, perspective view of the roping dummy shock absorber.

FIG. 4. illustrates the rod's 20 insertion into the roping dummy shock absorber 10 through the rod aperture 40.

Figure 5:
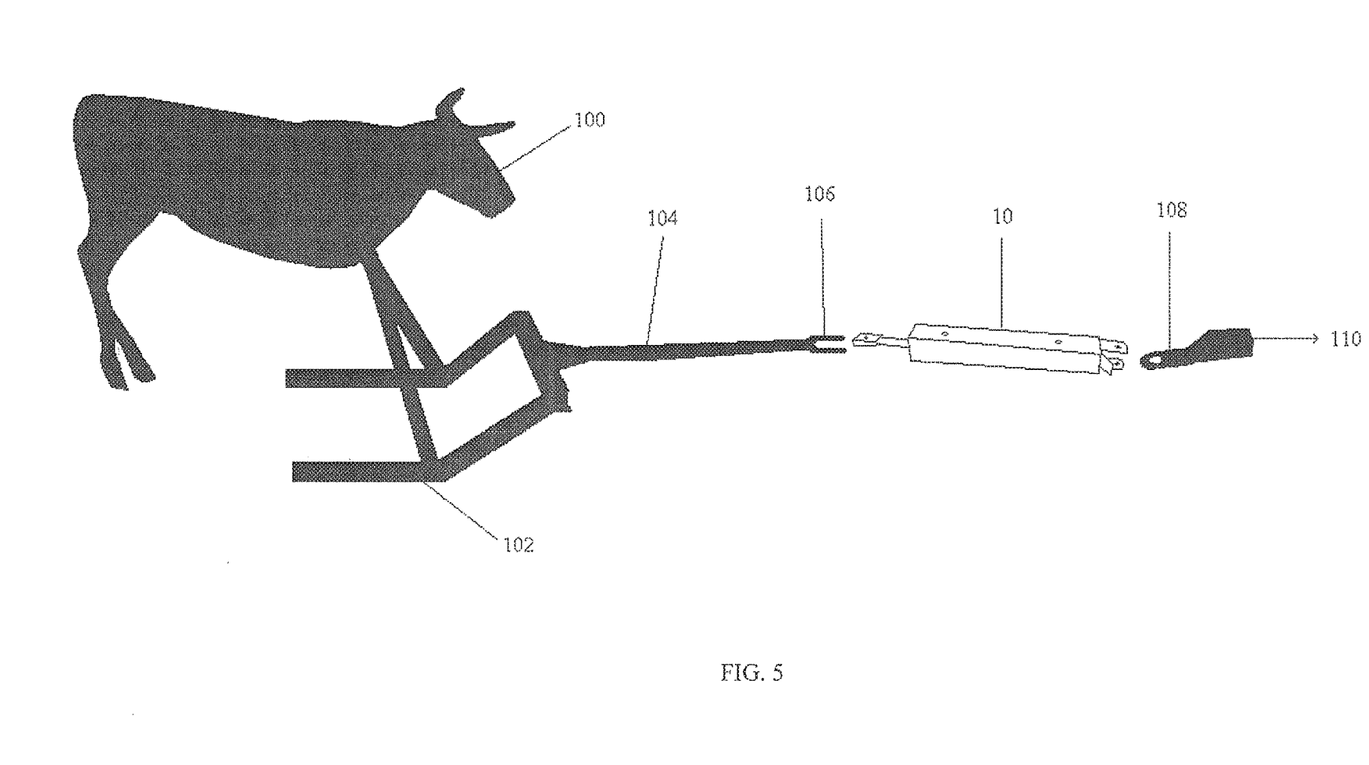
FIG. 5. is a perspective view of the roping dummy shock absorber as it would be connected to the dummy and the towing vehicle.

FIG. 5. illustrates the roping dummy shock absorber 10 as it would be connected between the dummy 100 and the towing vehicle (not shown). It is also anticipated that the roping dummy shock absorber 10 could be reversed in relation to the towing vehicle (not shown) and dummy 100. In other words, the rod 20 would attach to the towing vehicle (not shown) while the hitch 26 or moto end of the tube 12 would be attached to the tow bar 104.

Figure 6:
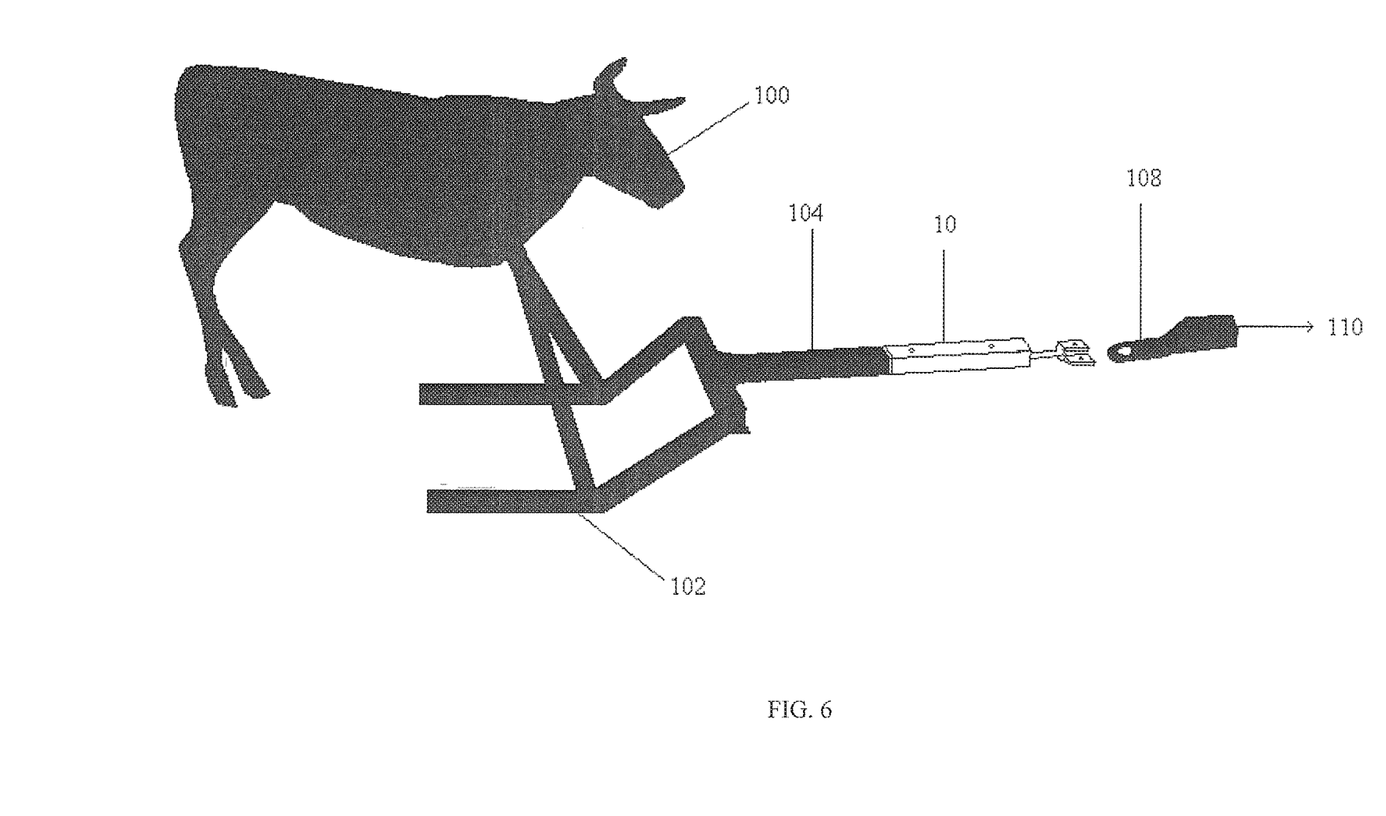
FIG. 6. a perspective view an alternative embodiment of the roping dummy shock absorber as it would be incorporated into the dummy.

FIG. 6. shows a first alternative embodiment in which the roping dummy shock absorber 10 is incorporated into the tow bar 104, thus making the roping dummy shock absorber 10 part of the manufacture of the dummy 100. In such an alternative embodiment, the tube 12 or moto-side end cap is connected to the tow bar 104, or the end of the tow bar 104 would serve as the tube 12.

In a second alternative embodiment, it is anticipated that the roping dummy shock absorber 10 could be incorporated into the tow bar 104, by incorporating rod 20 into the tow bar 104, such that the end of the tow bar 104 would serve as rod 20.

In each of these alternative embodiments, it is anticipated that certain modifications to the configurations of the parts of the roping dummy shock absorber 10 would be required, however basic elements would remain.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A shock absorption apparatus for use between a roping dummy and a towing vehicle, comprising:
   a hollow tube having a first end and a second end;
   a first end cap attached to said first end, said first end cap having a rod aperture through the approximate center of said end first end cap;
   an elongated rod;
   wherein said aperture is sized to allow said rod to slide through said aperture and said rod slidably extends through said rod aperture, and said rod having a first end inside of said tube and a second end outside of said tube;
   a second end cap attached to said tube second end;
   a rod endpiece attached to said rod first end, said rod endpiece shaped and sized so as to allow it to move slidably through the interior of said tube;
   a second springstop slidably attached to said rod, wherein a rod third springset section extends between said rod endpiece and said second springstop;
   a first spring around said rod third springset section, wherein when a force is placed upon said rod which tends to pull said rod outwardly through said rod aperture said first spring acts in opposition to said force;
   a first hitch apparatus attached to said first end of said rod outside said tube, wherein said first hitch apparatus is removably attachable to said roping dummy; and
   a second hitch apparatus attached to said second end of said tube, wherein said second hitch apparatus is removably attachable to said towing vehicle.

2. The shock absorption apparatus of claim 1, further comprising:
   a first springstop slidably attached to said rod, wherein a rod second springset section extends between said second springstop and said first springstop; and
   a second spring around said rod second springset section, wherein when a force is placed upon said rod which tends to pull said rod outwardly through said rod aperture said second spring acts in opposition to said force.

3. The shock absorption apparatus of claim 2, further comprising:
   a rod third springset section extending between said first springstop and said first end cap; and
   a first spring around said rod third springset section, wherein when a force is placed upon said rod which tends to pull said rod outwardly through said rod aperture said first spring acts in opposition to said force.

4. The shock absorption apparatus of claim 2, further comprising:
   a fourth spring around said rod third springset section.

5. The shock absorption apparatus of claim 3, further comprising:
   a fourth spring around said rod third springset section; and
   a fifth spring around said rod second springset section.

6. The shock absorption apparatus of claim 5, further comprising:
   a sixth spring around said rod first springset section.

7. The shock absorption apparatus of claim 1, further comprising:
   a pair of opposing turn stops attached to the first hitch apparatus, wherein said turn stops restrict the horizontal rotation of said shock absorption apparatus in relation to said towing vehicle.

8. The shock absorption apparatus of claim 7, further comprising a lubricant nozzle attached to said tube and in operative communication with the interior of said tube.

* * * * *